US012578932B2

(12) United States Patent
Liu et al.

(10) Patent No.: US 12,578,932 B2
(45) Date of Patent: Mar. 17, 2026

(54) PRESENTED CODE GENERATION OPTIONS FOR DATA STRUCTURES

(71) Applicant: Microsoft Technology Licensing, LLC, Redmond, WA (US)

(72) Inventors: Yi Liu, Woodinville, WA (US); Kristen Oshiro, Portland, OR (US); David Boyd Ludwig, IV, Seattle, WA (US); Alexander Drotar, Seattle, WA (US); Niraj Yadav, Bothell, WA (US); Yu Hu, Sammamish, WA (US); Haiyuan Cao, Issaquah, WA (US); Haoran Wei, Bellevue, WA (US); Jeremiah A. Nyman, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

(21) Appl. No.: 18/053,967

(22) Filed: Nov. 9, 2022

(65) Prior Publication Data

US 2024/0078092 A1      Mar. 7, 2024

Related U.S. Application Data

(60) Provisional application No. 63/404,034, filed on Sep. 6, 2022.

(51) Int. Cl.
*G06F 8/34*        (2018.01)
*G06F 8/35*        (2018.01)

(52) U.S. Cl.
CPC . *G06F 8/34* (2013.01); *G06F 8/35* (2013.01)

(58) Field of Classification Search
CPC ..... G06F 8/34; G06F 8/35; G06F 8/30; G06F 8/70; G06F 8/20

(Continued)

(56) References Cited

U.S. PATENT DOCUMENTS

| | | | | |
|---|---|---|---|---|
| 6,074,434 | A * | 6/2000 | Cole ......................... | G06F 8/64 |
| | | | | 717/173 |
| 6,965,990 | B2 * | 11/2005 | Barsness ................... | G06F 8/33 |
| | | | | 717/136 |

(Continued)

OTHER PUBLICATIONS

Nikam, et al., "Machine Learning for Generating Code from Images", in Journal of Information and Computational Science, vol. 10, Issue 10, 2020, pp. 280-290.

(Continued)

*Primary Examiner* — Thuy Dao
*Assistant Examiner* — Zengpu Wei
(74) *Attorney, Agent, or Firm* — Holzer Patel Drennan

(57) ABSTRACT

A method of assisting a user with the discovery of program features is provided. The method includes detecting a selection of a data structure within a user interface, determining a contextual parameter based on the selected data structure, the contextual parameter associated with a modifiable feature of the selected data structure, determining options for generating program code configured to modify the modifiable feature are available based on the contextual parameter and a predefined inferential relationship between the contextual parameter and the modifiable feature of the selected data structure, and prompting the user in the user interface with information indicating that the determined options for generating the program code are accessible in the user interface.

24 Claims, 6 Drawing Sheets

(58) Field of Classification Search

USPC .......................................................... 717/109

See application file for complete search history.

(56) References Cited

U.S. PATENT DOCUMENTS

| | | | | |
|---|---|---|---|---|
| 10,489,126 | B2 | 11/2019 | Kumar et al. | |
| 11,010,031 | B2 | 5/2021 | Migunova et al. | |
| 11,194,959 | B1 * | 12/2021 | Hitzler | G06F 9/453 |
| 11,442,702 | B2 * | 9/2022 | Smith | G06F 40/284 |
| 11,507,655 | B1 * | 11/2022 | Ketireddy | G06F 8/70 |
| 2013/0124604 | A1 * | 5/2013 | LeMaster | G06F 8/437 |
| | | | | 709/203 |
| 2019/0303107 | A1 | 10/2019 | Kelly | |
| 2020/0097261 | A1 * | 3/2020 | Smith | G06F 40/174 |
| 2020/0167134 | A1 * | 5/2020 | Dey | G06F 8/65 |
| 2021/0303271 | A1 * | 9/2021 | Hicklin | G06F 8/33 |
| 2022/0188079 | A1 | 6/2022 | Kohisseri et al. | |
| 2022/0214863 | A1 | 7/2022 | Clement et al. | |
| 2023/0229399 | A1 * | 7/2023 | Fox | G06F 9/451 |
| | | | | 717/105 |

OTHER PUBLICATIONS

Wu, et al., "Screen Parsing: Towards Reverse Engineering of UI Models from Screenshots", in Proceedings of 34th Annual ACM Symposium on User Interface Software and Technology, Oct. 10, 2021, pp. 470-483.

International Search Report and Written Opinion received for PCT Application No. PCT/US2023/030747, Nov. 28, 2023, 17 pages.

International Preliminary Report on Patentability received for PCT Application No. PCT/US2023/030747, Mar. 20, 2025, 12 pages.

Communication pursuant to Article 94(3) EPC Received in European Patent Application No. 23772349.9, mailed on Dec. 10, 2025, 08 pages.

* cited by examiner

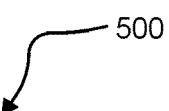

500

Detect a selection of a data structure within a user interface
502

Determine a contextual parameter based on the selected data structure, the contextual parameter associated with a modifiable feature of the selected data structure
504

Determine options for generating program code configured to modify the modifiable feature are available based on the contextual parameter and a predefined inferential relationship between the contextual parameter and the modifiable feature of the selected data structure
506

Prompt the user in the user interface with information indicating that the determined options for generating the program code are accessible in the user interface
508

FIG. 5

PRESENTED CODE GENERATION OPTIONS FOR DATA STRUCTURES

CROSS-REFERENCE TO RELATED APPLICATIONS

This application claims benefit of priority to U.S. Provisional Patent Application No. 63/404,034, entitled "Presented Code Generation Options For Data Structures" and filed on Sep. 6, 2022, which is specifically incorporated by reference for all that it discloses and teaches.

BACKGROUND

Application programming has evolved from program code-intensive methods to intuitive programming accessible to application developers with less programming expertise. User interfaces can provide guidance to an application developer unfamiliar with an application development environment for discovering useful features in the programming environment that might otherwise go unnoticed by the application developer.

SUMMARY

The described technology provides assistance to a user for the discovery of program features, including detecting a selection of a data structure within a user interface, determining a contextual parameter based on the selected data structure, the contextual parameter associated with a modifiable feature of the selected data structure, determining options for generating program code configured to modify the modifiable feature are available based on the contextual parameter and a predefined inferential relationship between the contextual parameter and the modifiable feature of the selected data structure, and prompting the user in the user interface with information indicating that the determined options for generating the program code are accessible in the user interface.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 5 illustrates example operations of assisting a user with the discovery of program features.

DETAILED DESCRIPTION

Figure 1:
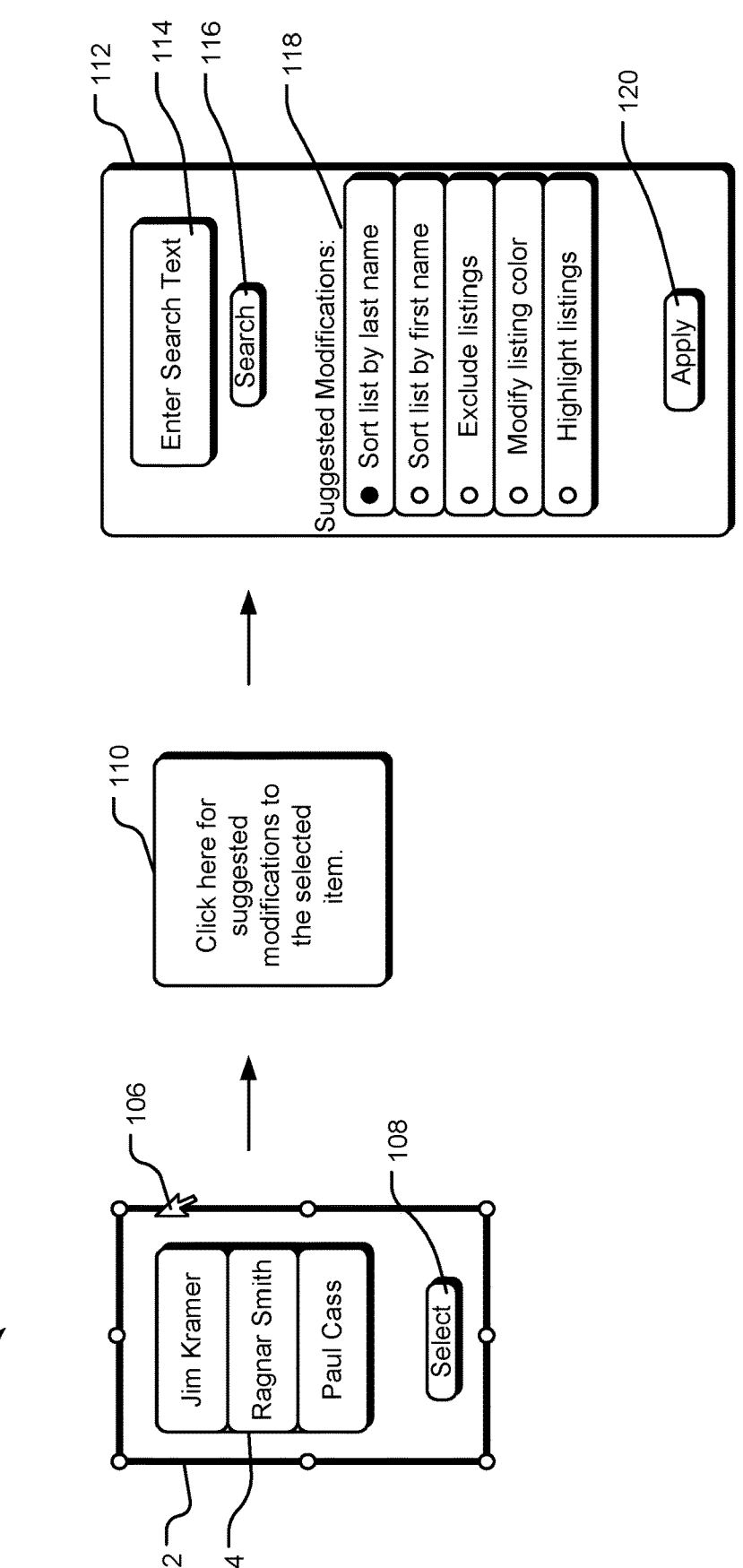
FIG. 1 illustrates an example system for assisting a user with the discovery of program features.

With the increase in computing resources in common computers, the emphasis in programming has changed from one of computational efficiency through direct program code generation to the use of predefined program code and data structures. Instead of syntax and other concerns, application developers rely on the predefined program code and structures to build applications that would take considerable time to program from scratch in program code. Application developers are often unaware of some potential predefined program code and structures available in an application development environment.

The presently disclosed technology assists application developers with the discovery of program features. Application developers attempt to program without fully exploring the available programmatic options in an application development environment. A user interface can prompt the application developer with suggestions for code or data structures to be used when developing the application with which the application developer is unlikely to be familiar. The user interface provides suggested modifications, including options for generating code to a selected data structure based on the context of the development environment.

In an implementation, when a user selects a data structure, the user interface prompts a user with information indicating that suggested modifications to the selected data structure are available. Each suggested modification includes an option for generating program code to modify the operation of the selected data structure. The suggested modifications may come in the form of premade data structures or code generated based on the context of the selected data structure. The prompt may be in the form of a pop-up or an information bubble. A selection of the prompt causes the user interface to display the suggested modifications. In implementations, the suggested modifications are displayed in the prompt itself or are presented in a separate user interface portion in response to the selection of a selectable link in the prompt. In an implementation, the user interface includes a code generation workspace presented separately of the selected data structure (e.g., in a sidebar, in a separate window, in a separate tab, or in a pop-up notification). In implementations, the code generation workspace is simultaneously presented in the user interface with a portion of the user interface that displays the selected data structure.

In an implementation, the suggested modifications are based on contextual parameters associated with modifiable features of the selected data structure. Examples of contextual parameters include properties of the selected data structure itself, properties of data bound to or referenced by the selected data structure, the types of data contained or referenced by the selected data structure, or parameters based on explicit data structure elements made in a query by the application developer. The contextual parameters are associated with the modifiable features of the selected data structure by a predefined relationship. The contextual parameters are used as input to an inferential model representing the predefined relationship to determine the suggested modifications.

Contextual parameters are parameters associated with the selected data structure. For example, contextual parameters include and/or are based on properties of the selected data structure itself, properties of structures referenced by or bound to the selected data structure, or features referenced by a natural language processing model. Examples of properties of the data structure itself include a name of the selected data structure, a type (e.g., list, button, switch, menu, etc.) of the selected data structure, a position in the application (e.g., a position within a user interface, a position within a user interface relative to another data structure in the user interface, or a position of data representing the selected data structure in storage) of the data structure, the type of data the selected data structure accepts (e.g., string data, integer data, floating point data, list data, tuple data, etc.), or properties of the selected data structure. Examples of properties of structures referenced by or bound to the selected data structure include a name (e.g., a table or database name) of the structure referenced or bound, a specific reference within the structure referenced or bound (e.g., a column identifier, a row identifier, a physical storage position for specific data, a logical address of specific data in the structure, type of column, type of row, etc.), a data source associated with the structure referenced or bound (e.g., libraries or external data sources), values of selections (e.g., enumerated or "enum" type values, such as statuses of active or inactive) associated with the structure referenced or bound, or data of the referenced or bound table that is used to reference another table of data (e.g., a name of the other table or a key to join the data of the referenced or bound table to join with the other table of data). In some implementations, the contextual parameters are generated based on query parameters output by a natural language processing model.

In implementations, the prompt and/or the code generation workspace include a field for receiving a query string from a user. The query string directs a search of suggested modifications that satisfy an explicit objective of the application programmer represented in the query string. In these implementations, a natural language processing model interprets the query string and outputs query parameters based on the query string. In an implementation, the query parameters are semantically associated with the words of the query string by the natural language processing model. In some implementations, the natural language processing model also accepts one or more contextual parameters to interpret the query string and output query parameters. In these implementations, displayed suggested modifications are based on the query parameters and the contextual parameters.

Using the contextual parameters and/or the query parameters as input, the inferential model (e.g., machine learning model or rule-based model) outputs suggested modification options, at least some of which are configured to modify a modifiable feature of the selected data structure associated with the contextual parameters and/or the query parameters. In implementations, the suggested modifications output by the inferential model initially include modifications that are incompatible with the selected data structure or its associated data. In an implementation, a compatibility manager attempts to execute the suggested modifications with the selected data structure. Suggested modifications that are compatible are included as suggested modifications with associated options for generating program code. Suggested modifications that are incompatible are filtered out and are not presented to the application developer.

FIG. 1 illustrates an example system 100 for assisting a user with the discovery of program features. In the illustrated implementation, a user (e.g., an application developer) has selected a selected data structure 102 using a mouse or other selection device represented in a user interface by a cursor 106. The data structure includes a presented list 104 of names and a select button 108. The user is creating a user interface in which an end-user can choose a name from the list 104 and click on the select button 108 to display more information. When the user selects the data structure 102, the user interface presents a prompt 110 that offers the user to "Click here for suggested modifications to the selected item." The user is likely unfamiliar with at least some of the programmatic features of the development environment of which the selected data structure is a part. If the user clicks on the prompt 110, the user is directed to a code generation workspace 112. The code generation workspace includes suggested modifications 118 that each include an option for generating program code. The suggested modifications 118 are presented in user-friendly functional terms (e.g., "Sort list by last name") that describe the options for generating program code associated with the suggested modifications 118. Examples of suggested modifications 118 to modifiable features of the selected data structure 102 include sorting elements of the selected data structure 102 by a property of the selected data structure 102 or a data structure referenced by the selected data structure 102, highlighting text in the selected data structure 102, coloring text in a text field of the selected data structure 102, excluding elements from the selected data structure 102, changing the size of the selected data structure 102, or changing the size of elements of the selected data structure 102.

In an implementation, the suggested modifications 118 are specific to the selected data structure 102. An inferential model (e.g., a machine learning model or rule-based model) outputs the suggested modifications 118 based on contextual parameters associated with the selected data structure 102. In an implementation, the contextual parameters are associated with modifiable features of the selected data structure 102 based on predefined relationships reflected in the inferential model. For example, contextual parameters include and/or are based on properties of the selected data structure itself, properties of structures referenced by or bound to the selected data structure, or features referenced by a natural language processing model. Examples of properties of the selected data structure 102 itself include a name of the selected data structure, a type of the selected data structure 102 (e.g., list, gallery, text field, button, switch, menu, etc.), a position in the application of the data structure 102 (e.g., a position within a user interface, a position within a user interface relative to another data structure in the user interface, or a position of data representing the selected data structure 102 in storage), the type of data the selected data structure 102 accepts (e.g., string data, integer data, floating point data, list data, tuple data, names, dates, etc.), or properties of the selected data structure 102. Examples of properties of structures referenced by or bound to the selected data structure 102 include a name (e.g., a table or database name) of the structure referenced or bound, a specific reference within the structure referenced or bound (e.g., a column identifier, a row identifier, a physical storage position for specific data, a logical address of specific data in the structure, type of column, type of row, etc.), a data source associated with the structure referenced or bound (e.g., libraries or external data sources), values of selections (e.g., enumerated or "enum" type values, such as statuses of active or inactive) associated with the structure referenced or bound, or data of the referenced or bound table that is used to reference another table of data (e.g., a name of the other table or a key to join the data of the referenced or bound table to join with the other table of data). In some implementations, the contextual parameters are based on query parameters output by a natural language processing model.

In an implementation, the prompt 110, the code generation workspace 112 (as illustrated), or another element of a user interface includes a query field 114. The query field 114 is configured to receive a query string from the user. When a query string is entered into the query field 114, and the search is submitted using a search button 116, a natural language processing model interprets the query string and outputs query parameters representing the query string.

Implementations are contemplated in which the query string is actively searched even without selecting the search button 116, which can correspondingly be omitted. In an implementation, the natural language processing model interprets the query string based on the selected data structure 102 (e.g., based on contextual parameters). In an implementation, if no query string is initially entered into the query field 114, the code generation workspace 112 initially presents suggested modifications 118 based on contextual parameters associated with the selected data structure 102. The suggested modifications 118 are subsequently altered in response to the entry of a query string into the query field 114 and/or a selection of the search button 116 based on a predefined relationship between the query parameters and the modifiable features (and/or modifications thereto) of the selected data structure 102 (if any is present in the code generation workspace 112).

In an implementation, the inferential model outputs suggested modifications with options for generating program code that do not function with the selected data structure 102. In an implementation, a compatibility manager executes the options for generating program code with the selected data structure 102 to determine whether the options for generating program code are valid for operation with the selected data structure. If an option for generating program code is determined to be valid, the associated suggested modification 118 is presented in the code generation workspace as an option for generating program code viewable by the user. If the option for generated program code is determined to be invalid, the associated suggested modification 118 is excluded from presentation to the user.

The code generation workspace 112 receives a selection of a suggested modification to apply (e.g., represented as a selected radio button) from a user when the user clicks the apply button 120. The option for generating program code of the selected suggested modification 118, illustrated as "Sort list by last name," is applied to the modifiable feature of the selected data structure 102 in response to the selection of the apply button 120. In the illustrated example, the list 104 will be sorted by the people's last names (e.g., "Paul Cass," "Jim Kramer," and then "Ragnar Smith").

Figure 2:
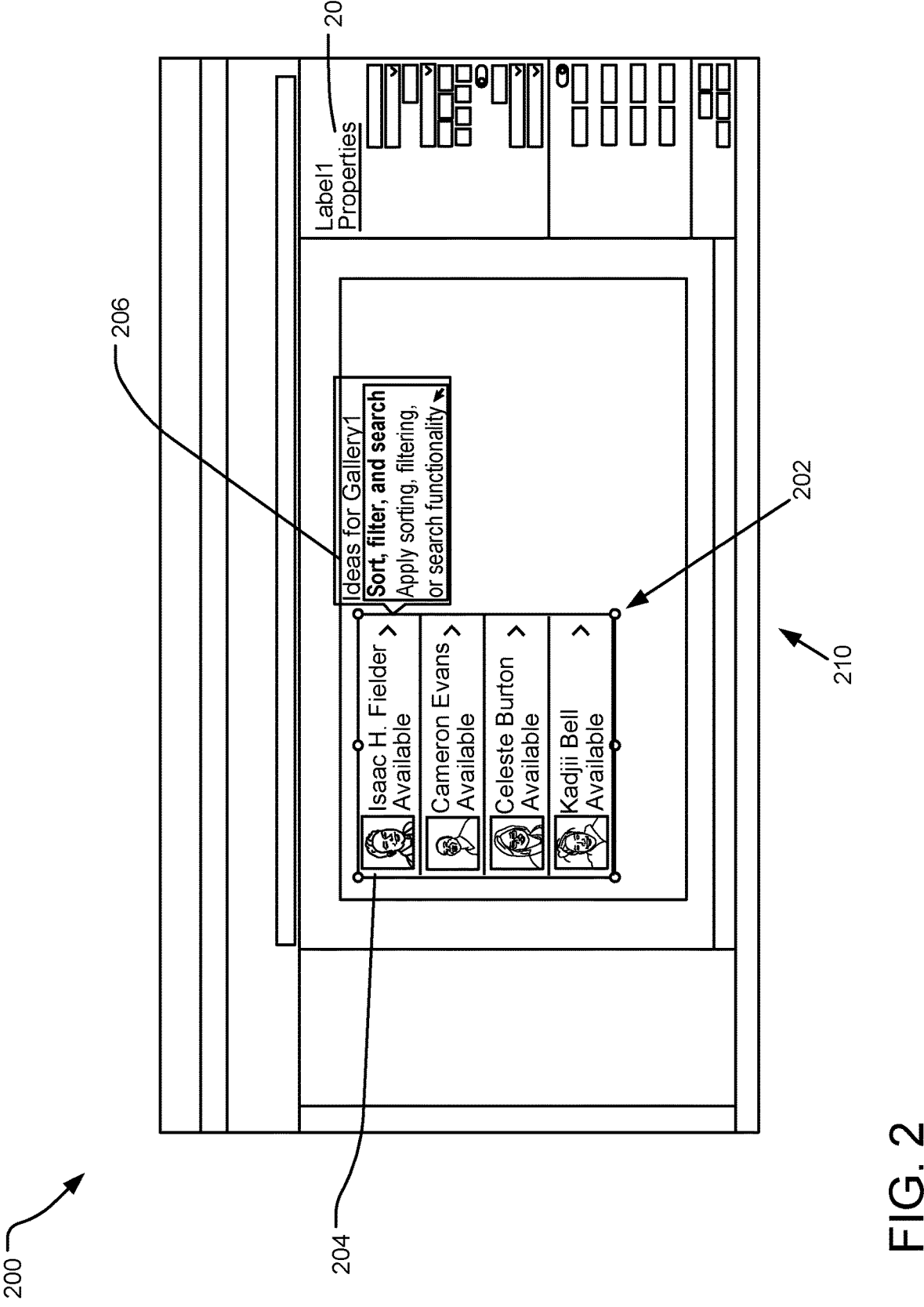
FIG. 2 illustrates an example user interface of an application development system.

FIG. 2 illustrates an example user interface 210 of an application development system 200. The user interface 210 includes a selected data structure 202 (e.g., a gallery). The selected data structure 202 (with the name "Gallery1") is a gallery-type data structure and is linked with a database (not illustrated). The database includes names of employees in an Employee database field and data associated with the employees. The gallery displays the employee names and provides options for manipulating or viewing data associated with the names. For example, entry 204 is for the employee "Isaac H. Fielder." Isaac H. Fielder is represented in the database as an employee with the value of the employee parameter, including the string "Isaac H. Fielder." The employee parameter is represented in the database as a column or row that stores the names of employees. The column represents a parameter "employee" with a parameter type of "name" (e.g., one or both examples of contextual parameters). An end-user (e.g., a client using the application developed by the application developer user) utilizing the user interface 210 can select entry 204 to display more data associated with the Isaac H. Fielder entry in the database.

In response to the user (e.g., an application developer) selecting the selected data structure 202, the application development system 200 determines whether there are options for generating program code for the selected data structure 202. The application development system 200 includes an inferential model that receives as input contextual parameters associated with the selected data structure 202. The inferential model represents inferential relationships between the modifiable features (and/or modifications thereto) of the selected data structure 202 and one or more of the contextual parameters or the query parameters. In response to the contextual parameters received, the inferential model determines suggested modifications to the modifiable features of the selected data structure 202 and associated options for generating program code to accomplish the modification. In the illustrated implementation, the contextual parameters available to the inferential model include, without limitation, properties of the data structure itself (e.g., the "Gallery 1" name, the Gallery data structure type, or other properties of the selected data structure 202 reflected in the properties tab 208 for the selected data structure 202) or properties of structures referenced by or bound to the selected data structure (e.g., properties of the database, such as the employees listed, the column or row of a table from which the employee names are derived, or data associated with the employees represented in the same or different tables).

In implementations, the inferential relationships between the contextual parameters, the query parameters, and/or the modifiable features of the selected data structure 202 represented in the inferential model are imperfect. In these implementations, the application development system 200 takes the potential options for generating program code output by the inferential model and determines whether the potential options for generating program code are compatible with the selected data structure 202 (e.g., using a compatibility manager). If the application development system 200 determines that one or more potential options for generating program code are compatible with the selected data structure, the application development system 200 determines that there are options for generating program code available for modifying a modifiable feature of the selected data structure 202.

In response to the determination that options for generating program code are available for modifying the modifiable feature of the selected data structure 202, the application development system 200 provides and/or displays the prompt 206. The prompt 206 is illustrated as a bubble emerging from the selected data structure 202. Other forms of the prompt 206 are contemplated, including a pop-up, a new window, a sidebar, an animation, and the like. In an implementation, the prompt 206 presents the user with information indicating that the suggested modifications, including the options for generating program code, are available. The user can select a selectable link in the prompt 206 to present the suggested modifications to the selected data structure (e.g., in a code generation workspace).

Figure 3:
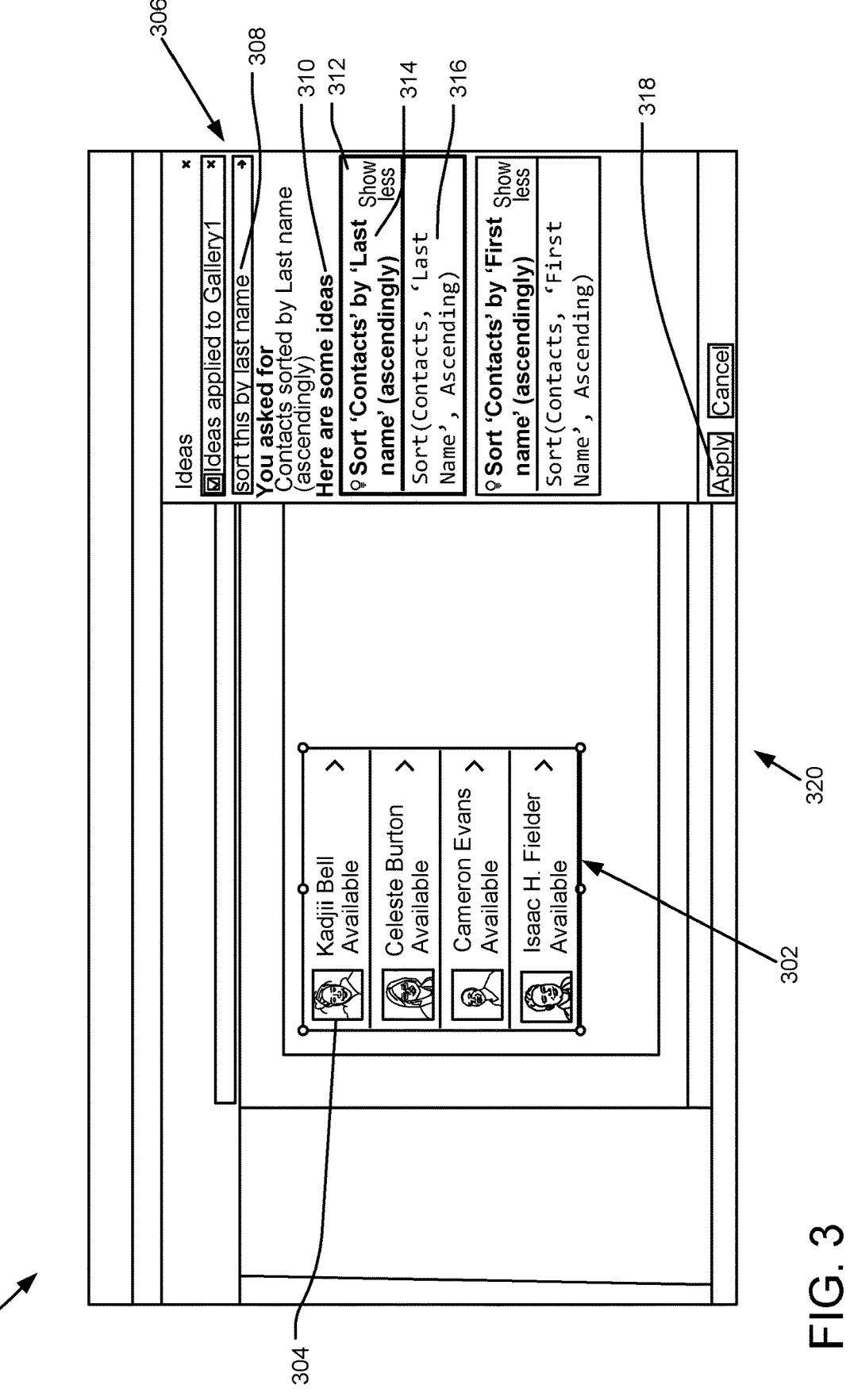
FIG. 3 illustrates another example user interface of another application development system.

FIG. 3 illustrates another example user interface 320 of another application development system 300. The application development system 300 has received a selection from a user (e.g., an application developer) of a selected data structure 302. In response to the selection of the selected data structure 302, the application development system 300 displays a code generation workspace 306. In implementations, the display of the code generation workspace 306 is responsive to the application development system 300 receiving a user selection of a selectable link in the prompt. For example, in an implementation (e.g., as illustrated with respect to FIG. 2), the selection of the selected data structure first causes an inferential model to determine whether suggested modifications are available, then causes a prompt to be displayed if suggested modifications are available, and then, upon receipt of a selection of a selectable link in the prompt, the application development system 300 displays the code generation workspace.

The code generation workspace 306 displays the suggested modifications 312. A selected suggested modification 312 includes a plain language descriptor 314 of the selected suggested modification 312 and an option for generating program code 316 to carry out the selected suggested modification 312 to the modifiable feature of the selected data structure 302. The plain language descriptor 314 informs the user that the suggested modification 312 sorts the gallery items representing Employee data from a database displayed in the selected data structure 302 ascendingly by the employee's last name. In this example, the sorting in ascending order is an example of a modification, the modifiable feature is the list in the selected data structure 302, and the last name of the employee is a contextual parameter. In an implementation, the selection itself (without applying the selection) provides a preview of the modifiable feature of the selected data structure 302 modified by the option for generating program code 316 associated with the suggested modification 312. Selection of an apply button 318 applies the option for generating program code 316 to the selected data structure 302. The preview illustrates the selected data structure 302 having been modified by the applied option for generating program code 316 to sort employee names in the selected data structure ascendingly by the last name of the employees (e.g., relative to the selected data structure 202 of FIG. 2, which is not sorted by last name). If the application development system 300 receives the selection of the apply button 318, the previewed modification will be accepted.

In the illustrated implementation, the code generation workspace 306 includes a query field 308. In the query field 308, a query string, "sort this by last name," is received. The application development system 300 receives the query string and uses a query manager (e.g., including a natural language processing model) to semantically interpret the query string and yield query parameters semantically representative of the query string. In an implementation, the query manager determines the query parameters further based on contextual parameters.

In implementations, the query parameters and contextual parameters associated with the selected data structure 302 are inputted into an inferential model, and the inferential model outputs potential modifications, including potential options for generating program code. In an implementation, a compatibility manager determines which of the potential options for generating program code are compatible with the selected data structure 302. The potential options for generating program code found to be compatible with the selected data structure 302 are presented as their associated suggested modifications 312 in the code generation workspace 306.

Although the code generation workspace 306 is illustrated as having received a query, "sort this by last name," in the query field 308, implementations are contemplated in which the application development system 300 provides the suggestion of sorting by last name based on the database referenced by or bound to the selected data structure 302 without an entered query or without the word "name" in the query. In this implementation, the contextual data used by the inferential model includes a parameter type discerned from the values in the selected data structure. For example, the entry 304 includes an employee name, "Kadji Bell." In implementations, the contextual parameters include the name itself, a name of the table or database, and/or a label of the column or row of the database or table from which the application development system 300 derived the value "Kadji Bell" (e.g., the column "Employee"). The query manager and/or the inferential model semantically interpret the values to determine that the type of data represented as a contextual parameter is a name-type parameter. This informs the suggested modifications 310 provided, even when a query does not explicitly include a name or when no query is entered. The use of a name is merely an example. For example, if a field or other element of the selected data structure includes the text string "2022," the query manager and/or the inferential model semantically interpret the values to determine that the type of parameter represented as a contextual parameter is a date.

Figure 4:
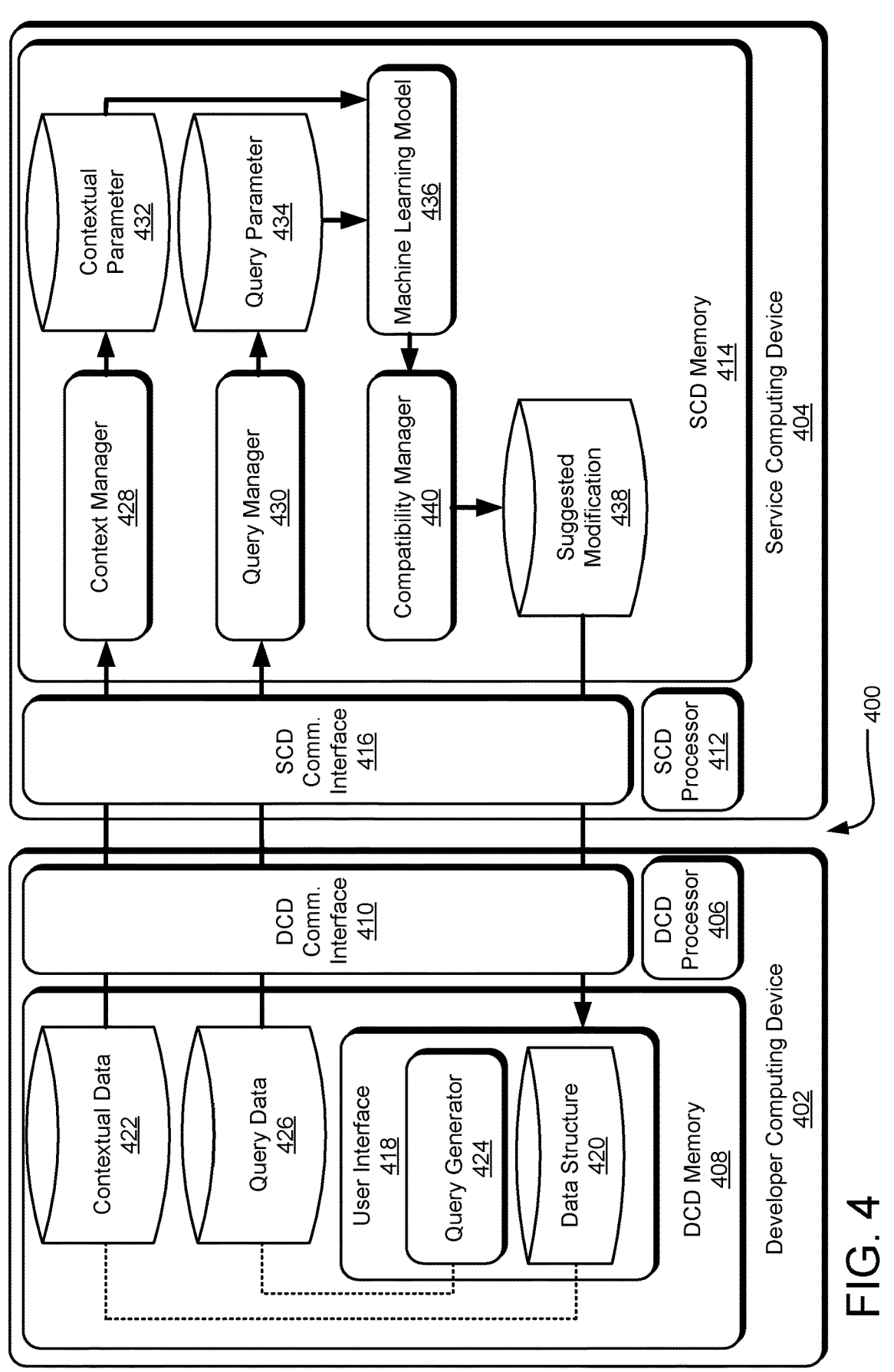
FIG. 4 illustrates an example application development system.

FIG. 4 illustrates an example application development system 400. As illustrated, the application development system 400 distributes operations between a developer computing device 402 of an application developer and a service computing device 404 of a service (e.g., a cloud service) offering application development services. It should be appreciated that implementations are contemplated in which the developer computing device 402 includes some or all of the features of the service computing device 404 (e.g., when the application development system 400 is not a cloud service and/or is completely or differently executable from the developer computing device 402).

The developer computing device 402 includes a developer computing device (DCD) processor 406, DCD memory 408, and a DCD communication interface 410. The service computing device 404 includes a service computing device (SCD) processor 412, SCD memory 414, and an SCD communication interface 416. The SCD communication interface 416 is in electronic communication with the DCD communication interface 410.

The DCD memory 408 includes a user interface manager 418. The user interface manager 418 is configured to receive data from the interaction of a user (e.g., an application developer) with a user interface, including a selection of a selected data structure 420 in the user interface. The DCD memory 408 stores contextual data 422 associated with the selected data structure 420 determined or provided by the DCD processor 406.

In an implementation, the application development system 400 is configured to transmit the contextual data 422 to a context manager 428 via the DCD communication interface 410 and the SCD communication interface 416. The context manager 428 derives or extracts the contextual parameter(s) 432 from the contextual data 422. Contextual parameter(s) 432 are parameters associated with the selected data structure 420. For example, contextual parameter(s) 432 include and/or are based on properties of the selected data structure 420 itself, properties of structures referenced by or bound to the selected data structure 420, or features referenced by a natural language processing model. Examples of properties of the selected data structure 420 itself include a name of the selected data structure 420, a type (e.g., list, button, switch, menu, etc.) of the selected data structure 420, a position in the application (e.g., a position within a user interface, a position within a user interface relative to another data structure in the user interface, or a position of data representing the selected data structure in storage) of the selected data structure 420, the type of data the selected data structure 420 accepts (e.g., string data, integer data, floating point data, list data, tuple data, etc.), or other properties of the selected data structure 420. Examples of properties of structures referenced by or bound to the selected data structure 420 include a name (e.g., a table or database name) of the structure referenced or bound, a specific reference within the structure referenced or bound (e.g., a column identifier, a row identifier, a physical storage position for specific data, a logical address of specific data in the structure, type of column, type of row, etc.), a data source associated with the structure referenced or bound (e.g., libraries or external data sources), values of selections (e.g., enumerated or "enum" type values, such as statuses of active or inactive) associated with the structure referenced or bound, or data of the referenced or bound table that is used to reference another table of data (e.g., a name of the other table or a key to join the data of the referenced or bound table to join with the other table of data). The contextual parameter(s) 432 and/or query parameter(s) 434 are associated with a modifiable feature of the selected data structure 420 based on a predefined relationship.

In an implementation, the user interface manager 418 includes the query generator 424 that generates query data 426 based on query strings received in the user interface manager 418 (e.g., in a query field). The query data 426 may include the query string data or a representation of the query data. In an implementation, the query generator 424 receives the query data 426 from a field in the user interface. The developer computing device 402 transmits the query data 426 to a query manager 430 of the service computing device 404 via the DCD communication interface 410 and the SCD communication interface 416. In an implementation, the query manager 430 semantically interprets the query data 426 using a natural language processing algorithm. Based on the content of the query string represented in the query data 426, the query manager 430 outputs the query parameter(s) 434 that semantically represents the query data 426. In an implementation, the query parameter(s) 434 is a vectorized, compressed, or reduced representation of the query data 426. In other implementations, a vectorized, compressed, or reduced representation of the query data 426 is used to select the query parameter(s) 434 from a predefined set of query parameter(s) 434. Implementations are contemplated in which the application development system 400 provides prompts that the suggested modifications 440 are available without any query data 426 provided by the user, and, in these implementations, one or more of the query generator 424, the query data 426, the query manager 430, and/or the query parameter(s) 434 can be omitted.

In an implementation, the context manager 428 determines the contextual parameter(s) 432 based on the contextual data 422 and further based on the query parameter(s) 434 and/or query data 426. In an implementation, the query manager 430 determines the query parameter(s) 434 based on the query data 426 and further based on the contextual parameter(s) 432 and/or the contextual data 422.

An inferential model 436 is configured to receive the contextual parameter(s) 432 and/or the query parameter(s) 434 as input. The contextual parameter(s) 432 and/or the query parameter(s) 434 are associated with a modifiable feature of the selected data structure 420 based on a predefined relationship represented in the inferential model 436. For example, in response to receiving the contextual parameter(s) 432 and/or the query parameter(s) 434 as input, the inferential model 436 outputs suggested the modifications 440 to the modifiable features based on the predefined relationship.

In an implementation, the inferential model 436 is trained using an inferential model trainer to establish the inferential relationship between modifiable features (and/or available modifications thereto) and one or more of the contextual parameter(s) 432 and the query parameter(s) 434. For supervised learning, the inferential model trainer inputs labeled data, including contextual parameter(s) 432 and/or query parameter(s) 434 labeled with label modifications, into the inferential model 436, responsively receives an output of a predicted modification (or a vector quantity representation thereof) from the inferential model 436, determines a loss based on a difference between label modifications (or a vector representation thereof) and the outputted predicted modification (or the vector representation thereof), and then propagates the loss through the inferential model 436 to adjust weights and/or biases in the inferential model 436. This supervised learning training method is only one example of a training method. Also, the inferential model 436 is only an example of an inferential model that can be used to determine the suggested modifications 440 to the selected data structure 420. Implementations are also contemplated in which a rule-based model is used (e.g., instead of or in addition to the inferential model 436) to determine the suggested modifications 440 based on receiving contextual parameter(s) 432 and/or query parameter(s) 434 from a predefined set of parameters to which the rules of the rule-based model are applied. In this implementation, the rules of the rule-based model reflect or represent the predefined relationship between the modifiable features (and/or modifications thereto) and one or more of the contextual parameter(s) 432 and the query parameter(s) 434.

Examples of inferential models 436 and/or natural language processing models (e.g., an element of the query manager 430) include, without limitation, machine learning model, rule-based models, data mining algorithms, artificial intelligence algorithms, masked learning models, natural language processing models, neural networks, artificial neural networks, perceptrons, feed-forward networks, radial basis neural networks, deep feed-forward neural networks, recurrent neural networks, long/short term memory networks, gated recurrent neural networks, autoencoders, variational autoencoders, denoising autoencoders, sparse autoencoders, Bayesian networks, regression models, decision trees, Markov chains, Hopfield networks, Boltzmann machines, restricted Boltzmann machines, deep belief networks, deep convolutional networks, genetic algorithms, deconvolutional neural networks, deep convolutional inverse graphics networks, generative adversarial networks, liquid state machines, extreme learning machines, echo state networks, deep residual networks, Kohonen networks, support vector machines, federated learning models, or neural Turing machines. In implementations, the inferential model trainer trains the inferential model 436 and/or the natural language processing model of the query manager 430 by an inference model training method. In this specification, examples of training methods (e.g., inferential and/or machine learning methods) can include, without limitation, one or more of masked learning modeling, unsupervised learning, supervised learning, reinforcement learning, self-learning, feature learning, sparse dictionary learning, anomaly detection, robot learning, association rule learning, manifold learning, dimensionality reduction, bidirectional transformation, unidirerctional tansformation, gradient descent, autoregression, autoencoding, permutation language modeling, two-stream self attenuation, federated learning, absorbing transformer-XL, natural language processing (NLP), bidirectional encoder representations from transformers (BERT) models and variants (e.g., RoBERTa, XLM-RoBERTa, and DistilBERT, ALBERT, CamemBERT, ConvBERT, DeBERTA, DeBERTA-v2, FlauBERT, I-BERT, herBERT, BertGeneration, BertJapanese, Bertweet, MegatronBERT, PhoBERT, MobileBERT, SqueezeBERT, BART, MBART, MBART-50BARThez, BORT, or BERT4REC), Allegro, cross-lingual language model (XLM) and variants (e.g., XLNet, XLM-ProphetNet, XLSR-Wav2Vec2, and Transformer XL), Auto Classes, BigBird, BigBirdPegasus, Blenderbot, Blenderbot Small, CLIP, CPM, CTRL, DeiT, DialoGPT, DPR, ELECTRA, Encoder Decoder Models, FSMT, Funnel Transformer, LayoutLM, LED, Longformer, LUKE, LXMERT, MarianMT, M2M100, MegatronGPT2, MPNet, MT5, OpenAI GPT, OpenAI GPT2, GPT Neo, Pegasus, ProphetNet, RAG, Reformer, Speech2Text, T5, TAPAS, Vision Transformer (ViT), OpenAI, GPT3, or Wav2Vec2. Alternatively, for rule-based models, the rules are established based on predefined relationships set by a manufacturer or developer.

In implementations in which the inferential model 436 determines a vector representation of a suggested modification 440, including an option for generating program code, the inferential model 436 or other elements of the service computing device 404 (e.g., a vector similarity interpreter) are configured to determine the suggested modifications 440 and associated options for generating program code based on the similarity (e.g., vector similarity) between the output and vectorized forms of available (e.g., predefined) modifications. In an implementation, the available modifications are represented as vectors and compared with the output of the inferential model 436 to determine whether the available modifications satisfy a similarity condition. The similarity condition may include a predefined threshold value of similarity or a predefined range of similarity. The similarity is calculated using any known method, for example, cosine similarity, Euclidian distance, or a dot product. If the similarity condition is satisfied (e.g., the suggested modification vectors are found to be sufficiently similar to the inferential model 436 output), the inferential model 436 or other elements of the service computing device 404 determine that the similar available modifications should be included in the suggested modifications 440.

In response to receiving the contextual parameter(s) 432 and/or the query parameter(s) 434 as input, the inferential model 436 (or other inferential model or rule-based model) outputs the suggested modifications 440. The suggested modifications 440 include, without limitation, a plain language descriptor and/or an option for generating program code. The option for generating program code includes program code that modifies the operation of the selected data structure 420 and/or data structures associated with, bound to, or referenced by the selected data structure 420.

In implementations, the output of the inferential model 436 includes available modifications with associated options for generating program code that are not compatible for operation with the selected data structure 420. In implementations, a compatibility manager 438 determines whether the available modifications, the vector representations of which satisfy the similarity condition, include options for generating program code that are compatible for operation with the selected data structure 420. The compatibility manager determines whether the available modifications satisfy a compatibility condition. The compatibility manager 438 tests the operation of the available modifications (e.g., their associated options for generating program code) on the associated modifiable features of the selected data structure 420 to see if the available modifications compile or execute without error. In this implementation, the available modifications are filtered to ensure that the suggested modifications 440 finally presented to the user do not modify the modifiable feature of the selected data structure 420 in a manner that will not function. Implementations are contemplated in which the compatibility manager 438 is omitted. For example, in an implementation, the inferential model 436 is specific to the selected data structure 420 (e.g., such that the output of the inferential model 436 is presumptively functional with the selected data structure 420).

In the illustrated implementation, the suggested modifications 440 are transmitted to the user interface manager 418 of the developer computing device 402 via the SCD communication interface 416 and the DCD communication interface 410. In implementations, the application development system 400 determines the suggested modifications 440 in response to the selection of the selected data structure 420. In an implementation, if there are determined suggested modifications 440 available, the user interface manager 418 instructs a user interface to provide a prompt. The prompt includes an indication that the suggested modifications 440 are available. In implementations, the prompt is in the form of a bubble emerging from the selected data structure, a pop-up, a new window, a sidebar, or an animation.

In an implementation, the user interface manager 418 is configured to receive a selection of a selectable link displayed with the prompt from the user and to responsively display the suggested modifications 440 in a code generation workspace. In an implementation, the code generation workspace is displayed in a portion of the user interface separate from a portion in which the selected data structure 420 is displayed (e.g., in a sidebar, in a separate window, in a separate tab, or in a pop-up notification). In an implementation, the code generation workspace includes a query field for receiving a text string from the user from which the query generator 424 determines the query data 426.

In an implementation, the user interface manager 418 is configured to receive a preview selection from the user to preview the effects of a suggested modification 440 on the selected data structure 420. The preview selection shows a preview of the selected data structure 420 modified by the option for generating program code in the user interface. In an implementation, the user interface manager 418 is configured to receive a selection of an apply button in the user interface (e.g., in the code generation workspace) to apply the option for generating program code of the selected suggested modification 440 to the selected data structure 420. In other implementations, the receipt of the selection of the suggested modification 440 itself by the user interface manager 418 is sufficient to cause the user interface manager 418 to apply the option for generating program code of the suggested modification 440 selected to the selected data structure 420.

In an implementation, the operation of the application development system 400 operates in two stages. The first stage is a prompt stage. The prompt stage can occur prior to the presentation of the code generation workspace. In this implementation, in the prompt stage, the user has yet to enter any query string and has not yet been presented with the code generation workspace in which the query field is presented. Accordingly, the prompt stage provides suggested modifications 440 based on the contextual data 422 and/or the contextual parameter(s) 432 (e.g., without regard to the query data 426 or query parameter(s) 434 that would be based on the query string not yet enterable into the query field not yet displayed). In this implementation, the suggested modifications 440 provided in the prompt stage could be less relevant to a user than in a stage in which a query string is considered in the generation of suggested modifications. However, the contextual data 422 and/or the contextual parameter(s) 432 are sufficient to inform the user that the suggested modifications 440 based on the contextual data 422 and/or the contextual parameter(s) 432 could be helpful to the user. The result of the prompt stage, if suggested modifications 440 based on the contextual data 422 and/or the contextual parameter(s) 432 are available, is that the user interface manager 418 instructs the user interface to display a prompt indicating that the suggested modifications 440 are available.

The second stage is a suggestion stage. In the suggestion stage, the user interface manager 418 has received an instruction from a user that a code generation workspace should be displayed in the user interface. The received instruction could include a selection by the user of an element of the prompt generated in the prompt stage. Based on the received instruction, the user interface manager 418 displays the code generation workspace. In an implementation, the code generation workspace initially displays the suggested modifications 440 determined in the prompt stage.

In an implementation, the code generation workspace includes the query field to receive the query string from the user. Upon receiving the query string, the query manager 430 generates the query data 426, which is transmitted to the query manager 430. Based on the query data 426, the query manager 430 generates the query parameter(s) 434. The query parameter(s) 434 are inputted with the contextual parameters(s) 432 into the inferential model 436 to yield the suggested modifications 440. In an implementation, the output of the inferential model 436 is used to refine (e.g., filter) the suggested modifications 440 from the prompt stage. In another implementation, the output of the inferential model 436 is used to yield new suggested modifications 440 without regard to the suggested modifications 440 in the prompt stage.

In another implementation, in the prompt stage, the application development system 400 determines a default query based on the contextual data 422, user preferences, and/or user history. The query generator 424 then initially generates the query data 426 based on the default query. In this implementation, the query manager 430 provides the query parameter(s) 434 based on the default query, and the suggested modifications 440 are based on the default query. Also, in an implementation of this implementation, in the suggestion stage, the code generation workspace displays the default query as a string in the query field. In this implementation, if the user enters a different query string in the query field, the query generator 424 generates an updated version of the query data 426, from which a new version of the query parameter(s) 434 is generated to yield an updated version of the suggested modifications 440.

In implementations, different inferential models 436 may be used depending on circumstances, including, without limitation, the stage of operation (e.g., the prompt stage or the suggestion stage) of the application development, the input parameters (e.g., contextual parameter(s) 432 and/or query parameter(s) 434) available to the inferential model 436, the nature of the parameters (e.g., the types of contextual parameter(s) 432 and/or query parameter(s) 434) available to the inferential model 436, whether a default query is provided, whether a user-entered query is provided, user preferences, or user history. In implementations, different similarity conditions may be used depending on circumstances, including, without limitation, the stage (e.g., prompt stage or suggestion stage) of operation of the application development, the input parameters (e.g., contextual parameter(s) 432 and/or query parameter(s) 434) available to the inferential model 436, the nature of the parameters (e.g., the types of contextual parameter(s) 432 and/or query parameter(s) 434) available to the inferential model 436, whether a default query is provided, whether a user-entered query is provided, user preferences, or user history.

FIG. 5 illustrates example operations 500 of assisting a user with the discovery of program features. A detecting operation 502 detects a selection of a data structure within a user interface. The detecting operation 502 uses a user interface manager configured to receive data from the interaction of a user (e.g., an application developer) with a user interface, including a selection of a selected data structure in the user interface.

A determining operation 504 determines a contextual parameter based on the selected data structure. The contextual parameter is associated with a modifiable feature of the selected data structure. The determining operation 504 uses a context manager to derive or extract contextual parameter(s) from contextual data associated with the selected data structure. Contextual parameter(s) are parameters associated with the selected data structure as described herein. The contextual parameter(s) and/or the query parameter(s) are associated with a modifiable feature of the selected data structure based on a predefined relationship. In implementations, the query manager outputs the query parameter(s) that semantically represents the query data in a generating operation that generates query parameters (not illustrated). Implementations are contemplated in which the application development system provides prompts that the suggested modifications are available without any query data provided by the user, and, in these implementations, the generating operation (not illustrated) is omitted.

In an implementation, the context manager determines the contextual parameter(s) based on the contextual data and further based on the query parameter(s) and/or query data. In an implementation, the query manager determines the query parameter(s) based on the query data and further based on the contextual parameter(s) and/or the contextual data.

A determining operation 506 determines that options for generating program code configured to modify the modifiable feature are available based on the contextual parameter and a predefined inferential relationship between the contextual parameter and the modifiable feature of the selected data structure. The determining operation 506 may use an inferential model configured to receive the contextual parameter(s) and/or the query parameter(s) as input. The contextual parameter(s) and/or the query parameter(s) are associated with a modifiable feature of the selected data structure based on a predefined relationship represented in the inferential model. For example, in response to receiving the contextual parameter(s) and/or the query parameter(s) as input, the inferential model outputs the suggested modifications to the modifiable features based on the predefined relationship as described herein.

The trainable inferential model is only an example of an inferential model that the determining operation 506 uses to determine the suggested modifications to the selected data structure. Implementations are also contemplated in which a rule-based model is used (e.g., instead of or in addition to the trainable inferential model) to determine the suggested modifications based on receiving contextual parameter(s) and/or query parameter(s) from a predefined set of parameters to which the rules of the rule-based model are applied. In this implementation, the rules of the rule-based model reflect or represent the predefined relationship between the modifiable features (and/or modifications thereto) and one or more of the contextual parameter(s) and the query parameter(s).

In implementations in which the inferential model determines a vector representation of a suggested modification, including an option for generating program code, the inferential model or other elements of the service computing device (e.g., a vector similarity interpreter) are configured to determine the suggested modifications and associated options for generating program code based on the similarity (e.g., vector similarity) between the output and vectorized forms of available (e.g., predefined) modifications as described herein.

In implementations, the output of the inferential model includes available modifications with associated options for generating program code that are not compatible for operation with the selected data structure. In implementations, the determining operation 506 uses a compatibility manager to filter potential modifications output by the inferential model to ensure that the suggested modifications finally presented to the user do not modify the modifiable feature of the selected data structure in a manner that will not function, as described herein.

Prompting operation 508 prompts the user in the user interface with information indicating that the determined options for generating the program code are accessible in the user interface. In an implementation, if there are determined suggested modifications available, the prompting operation 508 uses a user interface manager to instruct a user interface to provide a prompt. The prompt includes an indication that the suggested modifications are available. In implementations, the prompt is in the form of a bubble emerging from the selected data structure, a pop-up, a new window, a sidebar, or an animation.

In an implementation, the user interface manager is configured to receive a selection of a selectable link displayed with the prompt from the user and to responsively display the suggested modifications in a code generation workspace. In an implementation, the code generation workspace is displayed in a portion of the user interface separate from a portion in which the selected data structure is displayed (e.g., in a sidebar, in a separate window, in a separate tab, or in a pop-up notification). In an implementation, the code generation workspace includes a query field for receiving a text string from the user from which the query generator determines the query data.

In an implementation, the user interface manager is configured to receive a preview selection from the user to preview the effects of a suggested modification on the selected data structure. In an implementation, the user interface manager is configured to receive a selection of an apply button in the user interface to apply the option for generating program code of the selected suggested modification to the selected data structure.

Figure 6:
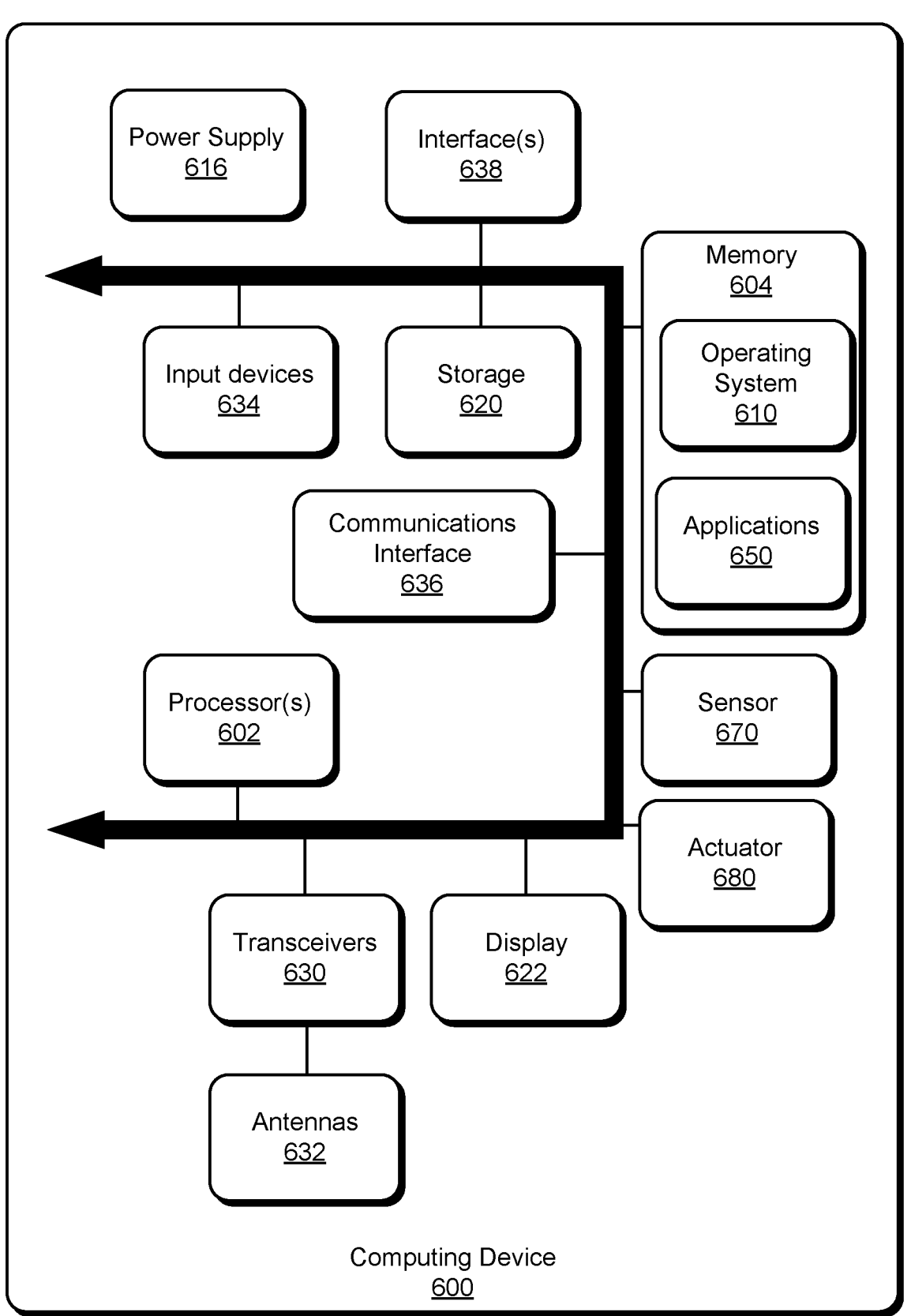
FIG. 6 illustrates an example of a computing system.

FIG. 6 illustrates an example computing device 600 for implementing the features and operations of the described technology. The computing device 600 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more processor(s) 602 and a memory 604. The memory 604 generally includes both volatile memory (e.g., RAM) and nonvolatile memory (e.g., flash memory). An operating system 610 resides in the memory 604 and is executed by the processor(s) 602.

In an example computing device 600, as shown in FIG. 6, one or more modules or segments, such as automated actuator protocols, applications 650, a user interface manager, a query generator, a context manager, a query manager, an inferential model, a code generation workspace, a user interface, or a compatibility manager, are loaded into the operating system 610 on the memory 604 and/or storage 620 and executed by processor(s) 602. The storage 620 may include one or more tangible storage media devices and may store a data structure, a selection, a prompt, a selectable link, query data, contextual data, a contextual parameter, a query parameter, a suggested modification, a user interface, a code generation workspace, a query field, a query string, a plain language descriptor, an option for generating program code, locally and globally unique identifiers, requests, responses, or other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a communications interface 636 (e.g., a network adapter), which is a type of computing device. The computing device 600 may use the communications interface 636 and any other types of computing devices for establishing connections over a wide-area network (WAN) or local-area network (LAN). It should be appreciated that the network connections shown are examples and that other computing devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The computing device 600 may further include a display 622, such as a touch screen display.

In implementations in which the computing device 600 includes or is an automated (e.g., robotic) device, the computing device 600 may include an actuator 680 adapted to engage elements of the apparatuses disclosed herein. The actuator 680 may be operable to perform operations disclosed herein (e.g., by executing by the processor(s) 602 automated actuator protocols stored in the storage 620 and/or the memory 604). The actuator 680 may be operated in conjunction with a sensor 670 to use detections of the sensor 670 to guide the motion of the actuator 680 in a feedback loop.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," "manager," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," "manager," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

An example method of assisting a user with discovery of program features is provided. The method includes detecting a selection of a data structure within a user interface; determining a contextual parameter based on the selected data structure, the contextual parameter associated with a modifiable feature of the selected data structure; determining options for generating program code configured to modify the modifiable feature are available based on the contextual parameter and a predefined inferential relationship between the contextual parameter and the modifiable feature of the selected data structure; and prompting the user in the user interface with information indicating that the determined options for generating the program code are accessible in the user interface.

Another example method of any preceding method is provided, wherein the operation of determining options for generating program code includes: outputting the options for generating program code from an inferential model in response to input of the contextual parameter based on the predefined inferential relationship.

Another example method of any preceding method is provided, wherein the operation of prompting includes: displaying a selectable link, the selectable link configured, responsive to receiving a selection of the selectable link by a user, to display a code generation workspace in the user interface, the code generation workspace configured to display the options for generating the program code.

Another example method of any preceding method is provided, wherein the operation of prompting includes: displaying a code generation workspace in the user interface; and displaying the options for generating the program code in the displayed code generation workspace.

Another example method of any preceding method is provided, the method further including generating a query parameter based on query data representing a query string received in the user interface, wherein the operation of determining options for generating program code is further based on the query parameter and wherein the predefined inferential relationship is between the contextual parameter, the query parameter, and the modifiable feature of the selected data structure.

Another example method of any preceding method is provided, wherein the operation of determining includes: determining a parameter type of a feature of the selected data structure based on a value of the feature of the selected data structure, wherein the contextual parameter is determined based on the determined parameter type.

Another example method of any preceding method is provided, the method further including receiving a selection of a suggested modification associated with one of the options for generating program code; and modifying the selected data structure based on the selected one of the options for generating program code.

An example system for assisting a user with discovery of program features is provided. The system includes one or more hardware processors; a user interface manager executable by the one or more hardware processors and configured to detect a selection of a data structure within a user interface; a context manager executable by the one or more hardware processors and configured to determine a contextual parameter based on the selected data structure, the contextual parameter associated with a modifiable feature of the selected data structure; and an inferential model executable by the one or more hardware processors and configured to determine options for generating program code configured to modify the modifiable feature are available based on the contextual parameter and a predefined inferential relationship between the contextual parameter and the modifiable feature of the selected data structure, wherein the user interface manager is further configured to prompt the user by displaying a user prompt in the user interface with information indicating that the determined options for generating the program code are accessible in the user interface.

Another example system of any preceding system is provided, wherein the inferential model is a machine learning model trained to output the options for generating program code in response to input of the contextual parameter based on the predefined inferential relationship.

Another example system of any preceding system is provided, wherein the displayed user prompt includes a selectable link, the selectable link configured, responsive to receiving a selection of the selectable link, to display a code generation workspace in the user interface, the code generation workspace configured to present the options for generating the program code.

Another example system of any preceding system is provided, wherein the contextual parameter is based on a reference data structure referenced by the selected data structure.

Another example system of any preceding system is provided, further including a query manager executable by the one or more hardware processors and configured to generate a query parameter based on query data representing a query string received in the user interface, wherein the inferential model generates the options for generating program code further based on the query parameter and wherein the predefined inferential relationship is between the contextual parameter, the query parameter, and the modifiable feature of the selected data structure.

Another example system of any preceding system is provided, wherein the context manager is further configured to determine a parameter type of a feature of the selected data structure based on a value of the feature of the selected data structure, wherein the determined contextual parameter includes the determined parameter type.

Another example system of any preceding system is provided, wherein the user interface manager is further configured to: receive a selection of a suggested modification associated with one of the options for generating program code; and modify the modifiable feature of the selected data structure based on the selected one of the options for generating program code.

One or more example tangible processor-readable storage media embodied with instructions for executing on one or more processors and circuits of a computing device a process of assisting a user with discovery of program features is provided. The process includes detecting a selection of a data structure within a user interface; determining a contextual parameter based on the selected data structure, the contextual parameter associated with a modifiable feature of the selected data structure; determining options for generating program code configured to modify the modifiable feature are available based on the contextual parameter and a predefined inferential relationship between the contextual parameter and the modifiable feature of the selected data structure; and prompting the user in the user interface with information indicating that the determined options for generating the program code are accessible in the user interface.

One or more other example tangible processor-readable storage media of any preceding media are provided, wherein the operation of determining options for generating program code includes: outputting the options for generating program code from an inferential model in response to input of the contextual parameter based on the predefined inferential relationship.

One or more other example tangible processor-readable storage media of any preceding media are provided, wherein the operation of prompting includes displaying a selectable link, the selectable link configured, responsive to receiving a selection of the selectable link, to display a code generation workspace in the user interface, the code generation workspace configured to display the options for generating the program code.

One or more other example tangible processor-readable storage media of any preceding media are provided, wherein the operation of prompting includes: displaying a code generation workspace in the user interface; and displaying the options for generating the program code in the displayed code generation workspace.

One or more other example tangible processor-readable storage media of any preceding media are provided, the process further comprising: generating a query parameter based on query data representing a query string received in the user interface, wherein the operation of determining options for generating program code is further based on the query parameter and wherein the predefined inferential relationship is between the contextual parameter, the query parameter, and the modifiable feature of the selected data structure.

One or more other example tangible processor-readable storage media of any preceding media are provided, the process further comprising: receiving a selection of a suggested modification associated with one of the options for generating program code; and modifying the selected data structure based on the selected one of the options for generating program code.

An example system of assisting a user with discovery of program features is provided. The system includes means for detecting a selection of a data structure within a user interface; means for determining a contextual parameter based on the selected data structure, the contextual parameter associated with a modifiable feature of the selected data structure; means for determining options for generating program code configured to modify the modifiable feature are available based on the contextual parameter and a predefined inferential relationship between the contextual parameter and the modifiable feature of the selected data structure; and means for prompting the user in the user interface with information indicating that the determined options for generating the program code are accessible in the user interface.

Another example system of any preceding system is provided, wherein the means for determining options for generating program code include means for outputting the options for generating program code from an inferential model in response to input of the contextual parameter based on the predefined inferential relationship.

Another example system of any preceding system is provided, wherein the means for prompting include means for displaying a selectable link, the selectable link configured, responsive to receiving a selection of the selectable link by a user, to display a code generation workspace in the user interface, the code generation workspace configured to display the options for generating the program code.

Another example system of any preceding system is provided, wherein the means for prompting include means for displaying a code generation workspace in the user interface; and means for displaying the options for generating the program code in the displayed code generation workspace.

Another example system of any preceding system is provided, the system further including means for generating a query parameter based on query data representing a query string received in the user interface, wherein the means for determining options for generating program code determine options for generating program code further based on the query parameter and wherein the predefined inferential relationship is between the contextual parameter, the query parameter, and the modifiable feature of the selected data structure.

Another example system of any preceding system is provided, wherein the means for determining include means for determining a parameter type of a feature of the selected data structure based on a value of the feature of the selected data structure, wherein the contextual parameter is determined based on the determined parameter type.

Another example system of any preceding system is provided, the system further including means for receiving a selection of a suggested modification associated with one of the options for generating program code; and means for modifying the selected data structure based on the selected one of the options for generating program code.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. Furthermore, it should be understood that logical operations may be performed in any order, adding or omitting operations as desired, regardless of whether operations are labeled or identified as optional, unless explicitly claimed otherwise or a specific order is inherently necessitated by the claim language. In some cases, the actions recited in the claims can be performed in a different order and still achieve desirable results. In certain circumstances, multitasking and parallel processing may be advantageous. The logical operations making up implementations of the technology described herein may be referred to variously as operations, steps, objects, or modules.

Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

What is claimed is:

1. A method of assisting a user with discovery of program features of an application program being developed within an application development system, the method comprising:

detecting a selection of a data structure within a user interface of the application development system, wherein the data structure stores data content presented in the user interface;

determining a contextual parameter based on the selected data structure, the contextual parameter being associated with a modifiable feature of the selected data structure and the modifiable feature being configurable, using a one or more modifications corresponding to the modifiable feature, to change how the data content is presented in the user interface;

determining available options for generating program code of the application program to modify the modifiable feature of the selected data structure in accordance with the one or more modifications corresponding to the modifiable feature based on the contextual parameter and a predefined relationship between the contextual parameter and the modifiable feature of the selected data structure, wherein the predefined relationship is reflected in an inferential model and the available options are determined concurrently with the data content of the selected data structure being presented in the user interface; and prompting the user in the user interface with information indicating that the available options for generating the program code are accessible in the user interface, based on determining the available options, wherein the available options are presented to the user concurrently with the data content of the selected data structure being presented in the user interface and presentation of the data content of the selected data structure is modified according to the program code generated for a selected one of the available options.

2. The method of claim 1, wherein determining options for generating the program code includes:

determining the available options for generating the program code using the inferential model in response to input of the contextual parameter based on the predefined relationship.

3. The method of claim 1, wherein prompting includes:

displaying a selectable link, the selectable link configured, responsive to receiving a selection of the selectable link by a user, to display a code generation workspace in the user interface, the code generation workspace configured to display the available options for generating the program code.

4. The method of claim 1, wherein prompting includes:

displaying a code generation workspace in the user interface; and displaying the available options for generating the program code in the displayed code generation workspace.

5. The method of claim 1, the method further comprising:

generating a query parameter based on query data representing a query string received in the user interface, wherein determining the available options for generating the program code is further based on the query parameter and wherein the predefined inferential relationship is between the contextual parameter, the query parameter, and the modifiable feature of the selected data structure.

6. The method of claim 1, wherein determining the contextual parameter includes:

determining a parameter type of a feature of the selected data structure based on a value of the feature of the selected data structure, wherein the contextual parameter is determined based on the determined parameter type.

7. The method of claim 1, the method further comprising:
receiving a selection of an available option of the available options for generating the program code; and
modifying the selected data structure based on the selected available option.

8. The method of claim 1, wherein prompting the user in the user interface further comprises presenting, for each of the available options, a corresponding object in the user interface representing the respective available option, the corresponding object being selectable to generate the program code configured to modify the modifiable feature in accordance with the respective available option.

9. The method of claim 1, wherein determining the available options includes:
including, in the available options, compatible options that are compatible with the selected data structure;
excluding, from the available options, incompatible options that are incompatible with the selected data structure; and
displaying, on the user interface for each of the included compatible options, a corresponding object being selectable to generate the program code configured to modify the modifiable feature in accordance with the respective available option.

10. The method of claim 1, wherein the contextual parameter includes a property of the data content stored in the selected data structure or a property of a reference data structure associated with the selected data structure.

11. The method of claim 1, wherein the selection includes an interaction with a user interface element corresponding to the data structure.

12. A system for assisting a user with discovery of program features of an application program being developed within an application development system, the system comprising:
one or more hardware processors;
a user interface manager executed by the one or more hardware processors and configured to detect a selection of a data structure within a user interface of the application development system, wherein the data structure stores data content presented in the user interface;
a context manager executed by the one or more hardware processors and configured to determine a contextual parameter based on the selected data structure, the contextual parameter being associated with a modifiable feature of the selected data structure and the modifiable feature being configurable, using one or more modifications corresponding to the modifiable feature, to change how the data content is presented in the user interface; and
an inferential model executed by the one or more hardware processors and configured to determine available options for generating program code to modify the modifiable feature of the selected data structure of the application program in accordance with the one or more modifications corresponding to the modifiable feature based on the contextual parameter and a predefined relationship between the contextual parameter and the modifiable feature of the selected data structure, wherein the predefined relationship is reflected in the inferential model, and the available options are determined concurrently with the data content of the selected data structure being presented in the user interface,
wherein the user interface manager is further configured to prompt the user by displaying a user prompt in the user interface with information indicating that the available options for generating the program code are accessible in the user interface, based on determining the available options, wherein the available options are presented to the user concurrently with the data content of the selected data structure being presented in the user interface and presentation of the data content of the selected data structure is modified according to the program code generated for a selected one of the available options.

13. The system of claim 12, wherein the inferential model is a machine learning model trained to determine the available options for generating the program code in response to input of the contextual parameter based on the predefined relationship.

14. The system of claim 12, wherein the displayed user prompt includes a selectable link, the selectable link configured, responsive to receiving a selection of the selectable link, to display a code generation workspace in the user interface, the code generation workspace configured to present the available options for generating the program code.

15. The system of claim 12, wherein the contextual parameter is based on a reference data structure referenced by the selected data structure.

16. The system of claim 12, further comprising:
a query manager executed by the one or more hardware processors and configured to generate a query parameter based on query data representing a query string received in the user interface,
wherein the inferential model generates the available options for generating the program code further based on the query parameter and wherein the predefined inferential relationship is between the contextual parameter, the query parameter, and the modifiable feature of the selected data structure.

17. The system of claim 12, wherein the context manager is further configured to determine a parameter type of a feature of the selected data structure based on a value of the feature of the selected data structure, wherein the determined contextual parameter includes the determined parameter type.

18. The system of claim 12, wherein the user interface manager is further configured to:
receive a selection of an available option of the available options for generating the program code; and
modify the modifiable feature of the selected data structure based on the selected available option.

19. One or more tangible processor-readable storage media embodied with instructions for executing on one or more processors and circuits of a computing device a process of assisting a user with discovery of program features of an application program being developed within an application development system, the process comprising:
detecting a selection of a data structure within a user interface of the application development system, wherein the data structure stores data content presented in the user interface;
determining a contextual parameter based on the selected data structure, the contextual parameter being associated with a modifiable feature of the selected data structure and the modifiable feature being configurable, using one or more modifications corresponding to the modifiable feature, to change how the data content is presented in the user interface;
determining available options for generating program code to modify the modifiable feature of the selected data structure of the application program in accordance with the one or more modifications corresponding to the modifiable feature based on the contextual parameter and a predefined relationship between the contextual parameter and the modifiable feature of the selected data structure, wherein the predefined relationship is reflected in an inferential model and the available options are determined concurrently with the data content of the selected data structure being presented in the user interface; and prompting the user in the user interface with information indicating that the available options for generating the program code are accessible in the user interface, wherein the available options are presented to the user concurrently with the data content of the selected data structure being presented in the user interface and presentation of the data content of the selected data structure is modified according to the program code generated for a selected one of the available options.

20. The one or more tangible processor-readable storage media of claim 19, wherein determining available options for generating the program code includes:

determining the available options for generating the program code using the inferential model in response to input of the contextual parameter based on the predefined relationship.

21. The one or more tangible processor-readable storage media of claim 19, wherein prompting includes:

displaying a selectable link, the selectable link configured, responsive to receiving a selection of the selectable link, to display a code generation workspace in the user interface, the code generation workspace configured to display the available options for generating the program code.

22. The one or more tangible processor-readable storage media of claim 19, wherein prompting includes:

displaying a code generation workspace in the user interface; and displaying the available options for generating the program code in the displayed code generation workspace.

23. The one or more tangible processor-readable storage media of claim 19, the process further comprising:

generating a query parameter based on query data representing a query string received in the user interface;

wherein determining the available options for generating the program code is further based on the query parameter and wherein the predefined inferential relationship is between the contextual parameter, the query parameter, and the modifiable feature of the selected data structure.

24. The one or more tangible processor-readable storage media of claim 19, the process further comprising:

receiving a selection of an available option of the available options for generating the program code; and modifying the selected data structure based on the selected available option.

* * * * *